(12) United States Patent
Oguri et al.

(10) Patent No.: US 12,337,834 B2
(45) Date of Patent: Jun. 24, 2025

(54) TRAVELING SUPPORT DEVICE

(71) Applicant: DENSO CORPORATION, Kariya (JP)

(72) Inventors: Takaharu Oguri, Kariya (JP); Jin Kurumisawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 18/319,315

(22) Filed: May 17, 2023

(65) Prior Publication Data
US 2023/0286498 A1 Sep. 14, 2023

Related U.S. Application Data

(63) Continuation of application No. PCT/JP2021/039101, filed on Oct. 22, 2021.

(30) Foreign Application Priority Data

Nov. 19, 2020 (JP) ................................ 2020-192851

(51) Int. Cl.
*B60W 30/09* (2012.01)
*B60W 30/16* (2020.01)
(Continued)

(52) U.S. Cl.
CPC ............ *B60W 30/09* (2013.01); *B60W 30/16* (2013.01); *G06V 20/58* (2022.01); *G06V 20/588* (2022.01);
(Continued)

(58) Field of Classification Search
CPC .... B60W 10/04; B60W 10/184; B60W 10/18; B60W 30/09; B60W 30/16; B60W 50/14;
(Continued)

(56) References Cited

U.S. PATENT DOCUMENTS 10,037,472 B1 * 7/2018 Chen ...................... G06V 20/58
11,845,439 B2 * 12/2023 Kim ........................ B60W 60/00
(Continued)

*Primary Examiner* — Russell Frejd
*Assistant Examiner* — Brandon Z Willis
(74) *Attorney, Agent, or Firm* — Maschoff Brennan

(57) ABSTRACT

A traveling support device is applied to a vehicle equipped with an imaging device and performs a traveling support control on an own vehicle based on an image captured by the imaging device. The traveling support device includes: a recognizer that recognizes, based on the image, a forward object located ahead of the own vehicle in a direction of travel and a boundary portion located on each of left and right sides of a road on which the own vehicle is traveling; an angular width calculator that calculates an object point, which indicates a predetermined portion of the forward object, and a boundary point, which is on the boundary portion, on one line extending along the width of the own vehicle in the image and calculates, for the object point and the boundary point, an angular width based on an origin defined in the image; an obtainer that obtains distance information indicating a distance to the predetermined portion of the forward object; a lateral distance calculator that calculates, based on the angular width calculated by the angular width calculator and the distance information, a lateral distance between the predetermined portion of the forward object and the boundary portion along the width of the own vehicle; and a controller that performs the traveling support control to the forward object based on the lateral distance.

9 Claims, 11 Drawing Sheets

(51) Int. Cl.
*G06V 20/56* (2022.01)
*G06V 20/58* (2022.01)

(52) U.S. Cl.
CPC ... *B60W 2420/403* (2013.01); *B60W 2552/53* (2020.02); *B60W 2554/801* (2020.02)

(58) Field of Classification Search
CPC ..... B60W 2420/408; B60W 2420/403; B60W 2552/53; B60W 2552/10; B60W 2554/4041; B60W 2554/4044; B60W 2554/4045; B60W 2554/402; B60W 2554/4029; B60W 2554/404; B60W 2554/801; B60W 2554/802; B60W 2554/806; B60W 2754/10; B60W 2754/20; G06V 20/58; G06V 20/588; G08G 1/04; G08G 1/123; G08G 1/16; G08G 1/166; G08G 1/167; G05D 1/0242; G05D 1/0257; G05D 1/0231; G05D 1/24; G05D 1/242; G05D 1/622; G05D 1/633; G05D 1/686
See application file for complete search history.

(56) References Cited

U.S. PATENT DOCUMENTS

2015/0298692 A1* 10/2015 Minemura ............ B60W 30/09 701/1
2016/0375903 A1    12/2016 Minemura et al.
2020/0369274 A1* 11/2020 Mizuno ................ G01S 13/867

* cited by examiner

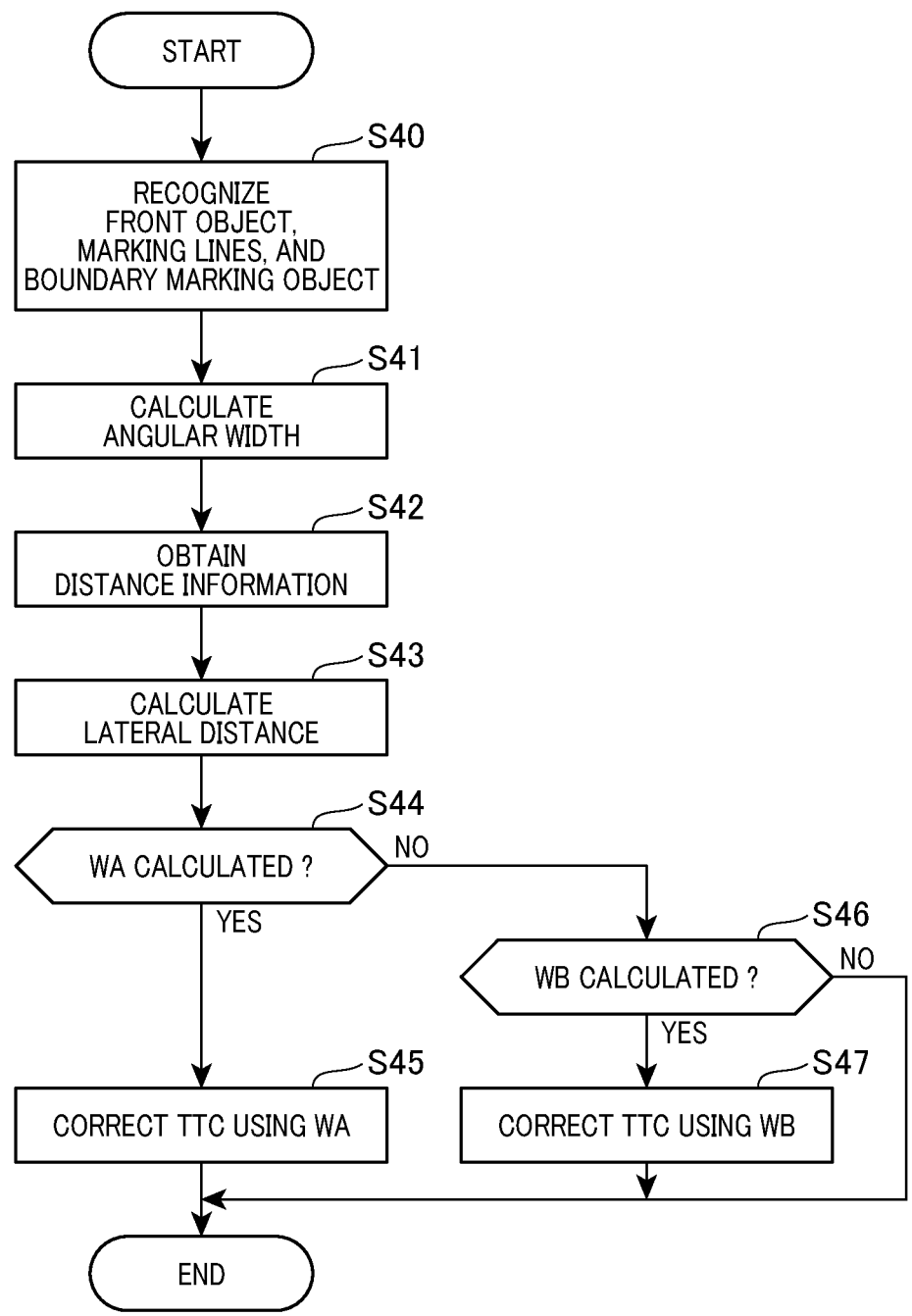

TRAVELING SUPPORT DEVICE

CROSS-REFERENCE TO RELATED APPLICATION

This application is the U.S. bypass application of International Application No. PCT/JP2021/039101, filed on Oct. 22, 2021 which designated the U.S. and claims priority to Japanese Patent Application No. 2020-192851, filed on Nov. 19, 2020, the contents of both of which are incorporated herein by reference.

TECHNICAL FIELD

The present disclosure relates to a traveling support device that performs a traveling support control for an own vehicle based on the position of an object present around the own vehicle.

BACKGROUND

A known traveling support device captures an image of surroundings of an own vehicle by an imaging device and performs a traveling support control for the own vehicle based on the captured image. For example, in the traveling support device disclosed in JP 5969534 B, the position of another vehicle located ahead of an own vehicle in a direction of travel is recognized using an image, and a traveling support control is performed for the own vehicle based on the distance from the other vehicle recognized and an own lane in which the own vehicle is traveling.

SUMMARY

The present disclosure provides a traveling support device that is applied to a vehicle equipped with an imaging device that captures an image of a surrounding of an own vehicle, and performs a traveling support control for the own vehicle based on the image captured by the imaging device. The traveling support device includes: a recognizer that recognizes, based on the image, a forward object located ahead of the own vehicle in a direction of travel and a boundary portion located on each of left and right sides of a road on which the own vehicle is traveling; an angular width calculator that calculates an object point and a boundary point on one line extending along a width direction of the own vehicle in the image and calculates, for the object point and the boundary point, an angular width based on an origin defined in the image, the object point indicating a predetermined portion of the forward object, the boundary point being on the boundary portion; an obtainer that obtains distance information indicating a distance to the predetermined portion of the forward object; a lateral distance calculator that calculates, based on the angular width calculated by the angular width calculator and the distance information, a lateral distance between the predetermined portion of the forward object and the boundary portion along the width of the own vehicle; and a controller that performs the traveling support control to the forward object based on the lateral distance.

The recognizer recognizes, as the front object, another vehicle traveling in an adjacent lane that is adjacent to an own lane in which the own vehicle is traveling, the angular width calculator calculates, as the angular width, a first angular width at a position of an own-vehicle-end lateral end portion of a rear surface of the other vehicle recognized by the recognizer and a second angular width at a position of a front-end portion of an own-vehicle-end side surface of the other vehicle, the lateral distance calculator calculates, as the lateral distance, a first lateral distance corresponding to the first angular width of the other vehicle and a second lateral distance corresponding to the second angular width of the other vehicle, and the controller performs the traveling support control for the other vehicle based on the first lateral distance and the second lateral distance to the other vehicle.

BRIEF DESCRIPTION OF THE DRAWINGS

The above features of the present disclosure will be made clearer by the following detailed description, given referring to the appended drawings. In the accompanying drawings:

FIG. 13 is a flowchart showing a processing flow of a PCS control according to the third embodiment.

DETAILED DESCRIPTION OF THE PREFERRED EMBODIMENTS

Figure 1:
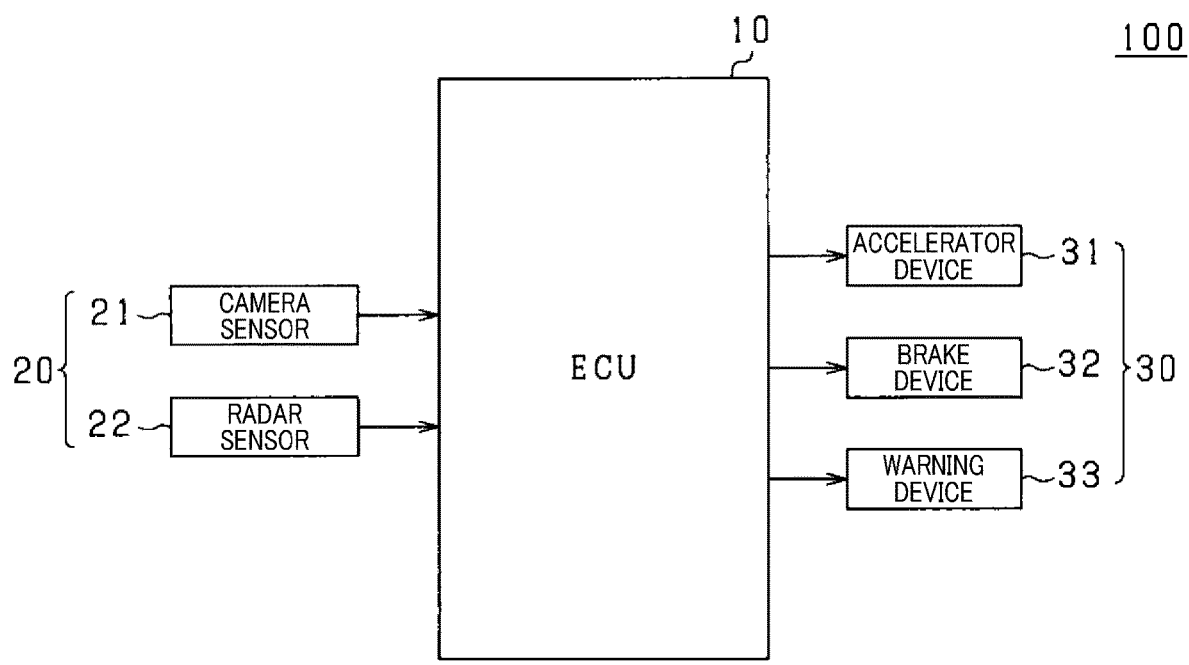
FIG. 1 is an overall configuration diagram of a traveling support system.

For example, in order to allow an own vehicle traveling in an own lane to travel while a proper positional relationship with another vehicle traveling ahead is maintained, the positional relationship between the other vehicle and the own vehicle needs to be properly determined. In this case, if the position of the other vehicle cannot be properly determined, there is a concern that control to avoid collision with the other vehicle and control to follow the other vehicle, for example, will no longer be properly performed. In order to address this problem, properly determining the position of another vehicle to properly perform a traveling support control has still room to improve.

The present disclosure has been conceived in view of the aforementioned problem and has a primary object to provide a traveling support device capable of properly performing a traveling support control.

The present disclosure provides a traveling support device that is applied to a vehicle equipped with an imaging device that captures an image of a surrounding of an own vehicle, and performs a traveling support control for the own vehicle based on the image captured by the imaging device. The traveling support device includes: a recognizer that recognizes, based on the image, a forward object located ahead of the own vehicle in a direction of travel and a boundary portion located on each of left and right sides of a road on which the own vehicle is traveling; an angular width calculator that calculates an object point and a boundary point on one line extending along a width direction of the own vehicle in the image and calculates, for the object point and the boundary point, an angular width based on an origin defined in the image, the object point indicating a predetermined portion of the forward object, the boundary point being on the boundary portion; an obtainer that obtains distance information indicating a distance to the predetermined portion of the forward object; a lateral distance calculator that calculates, based on the angular width calculated by the angular width calculator and the distance information, a lateral distance between the predetermined portion of the forward object and the boundary portion along the width of the own vehicle; and a controller that performs the traveling support control to the forward object based on the lateral distance.

The recognizer recognizes, as the front object, another vehicle traveling in an adjacent lane that is adjacent to an own lane in which the own vehicle is traveling, the angular width calculator calculates, as the angular width, a first angular width at a position of an own-vehicle-end lateral end portion of a rear surface of the other vehicle recognized by the recognizer and a second angular width at a position of a front-end portion of an own-vehicle-end side surface of the other vehicle, the lateral distance calculator calculates, as the lateral distance, a first lateral distance corresponding to the first angular width of the other vehicle and a second lateral distance corresponding to the second angular width of the other vehicle, and the controller performs the traveling support control for the other vehicle based on the first lateral distance and the second lateral distance to the other vehicle.

In the case where a forward object and a boundary portion of a road are recognized based on an image and the traveling support control is performed based on the positional relationship between the forward object and the boundary portion recognized, there is a concern that if the position of the forward object relative to the road is not properly detected, the traveling support control will not be properly performed. Regarding this point, in the present disclosure, a boundary point on the boundary portion and an object point indicating a predetermined portion of the forward object on one line extending along the width of the own vehicle are calculated, and an angular width based on the origin of the image is calculated for each of the object point and the boundary point. Furthermore, a lateral distance that is the distance between the predetermined portion of the forward object and the boundary portion along the width of the own vehicle is calculated based on the angular width and the distance information indicating the distance to the predetermined portion of the forward object. Subsequently, the traveling support control to the forward object is performed based on the lateral distance.

With this configuration, the position of the forward object relative to the boundary portion of the road can be properly determined at a desired position. In this case, even when the predetermined portion to be detected on the forward object varies every time depending on a travel scene or the like, the position of a desired portion can be properly detected. Thus, the position of the forward object can be properly detected and as a result, the traveling support control can be properly performed.

First Embodiment

Hereinafter, a first embodiment embodying a traveling support device according to the present disclosure will be described with reference to the drawings. A traveling support system 100 according to the present embodiment is installed in an own vehicle and detects an object (such as a vehicle, a pedestrian, or an obstacle on a road) located around the own vehicle.

As shown in FIG. 1, the traveling support system 100 according to the present embodiment includes an ECU 10 as a traveling support device, various sensors 20, and a controlled device 30. The various sensors 20 include a camera sensor 21 as an "imaging device" and a radar sensor 22. The controlled device 30 includes an accelerator device 31, a brake device 32, and a warning device 33.

The camera sensor 21 is, for example, a single-lens camera, and is installed, for example, in an upper end area of a windshield of the own vehicle. The camera sensor 21 captures an image of an object located ahead of the own vehicle at predetermined time intervals and obtains a captured image G (refer to FIG. 2).

The radar sensor 22, which is a distance measurement sensor that transmits probe waves to the surroundings of the own vehicle and receives the probe waves reflected, thereby obtaining distance information indicating the distance to an object located around the own vehicle, is attached to a front part of the own vehicle in such a manner that the optical axis thereof is directed forward of the own vehicle, for example. The radar sensor 22 emits probe waves, i.e., electromagnetic waves with directivity in the millimeter wave range, forward of the own vehicle at predetermined time intervals, and obtains, as distance information, the distance to an object and the direction of the object, for example, by receiving, by a plurality of antennas, the waves reflected off the surface of the object. The radar sensor 22 obtains the distance to the object through calculation using time at which the probe waves are transmitted and time at which the reflected waves are received. Furthermore, the radar sensor 22 obtains the direction of the object through calculation using the phase difference of the reflected waves received by the plurality of antennas.

The ECU 10 is a control device that includes a well-known microcomputer including a central processing unit (CPU), read-only memory (ROM), random-access memory (RAM), flash memory, and the like. The ECU 10 obtains the image G obtained from the camera sensor 21 and the distance information obtained from the radar sensor 22.

The ECU 10 performs an image recognition process such as template matching on the image G obtained by the camera sensor 21 and thus recognizes an object that is present in the image G and the type of the object (such as a vehicle, a pedestrian, or an obstacle on a road). In the present embodiment, a plurality of dictionaries that are image patterns indicating features of respective objects are stored as a template for identifying the type of each object. As the dictionaries, a whole-body dictionary including patterns of features of entire objects and a partial-body dictionary including patterns of partial features of objects are stored.

The ECU 10 performs marking line recognition based on a change in luminance on the image G. Specifically, the ECU 10 extracts, as an edge candidate point, a point of change in contrast (edge strength) between a road surface and a marking line that divides a traffic lane. Subsequently, a candidate line for the marking line is extracted from a series of edge candidate points extracted.

According to the distance to the object and the direction of the object that are included in the distance information obtained from the radar sensor 22, the ECU 10 calculates detection information such as a relative position of the object and a region in which the object is present.

The ECU 10 performs a traveling support control based on the detection information. In the present embodiment, an adaptive cruise control (ACC) and a pre-crash safety (PCS) are performed as the traveling support control.

The ACC control is a control in which another vehicle traveling ahead of the own vehicle in the direction of travel is selected as a leading vehicle and the driving force and the braking force of the own vehicle are adjusted using the controlled device 30 so that the own vehicle follows the leading vehicle. The PCS control is a control in which the controlled device 30 is controlled to avoid or reduce collision with a forward object located ahead of the own vehicle in the direction of travel (a collision damage reduction control).

Specifically, when performing the ACC control, the ECU 10 actuates the controlled device 30, i.e., the accelerator device 31 and the brake device 32, based on the current speed setting and the inter-vehicle distance to the leading vehicle. When performing the PCS control, the ECU 10 actuates the controlled device 30, i.e., the brake device 32 and the warning device 33, based on time to collision (TTC) which is estimated collision time for the own vehicle to collide with the forward object.

The accelerator device 31, which is an engine, a motor, or the like as a vehicle power source, applies a driving force to the own vehicle according to an accelerator operation performed by a driver or a control command from the ECU 10. The brake device 32 is provided on each wheel and applies a braking force to the own vehicle according to a braking operation performed by a driver or a control command from the ECU 10. According to a control command from the ECU 10, the warning device 33 informs, for example, a driver, that there is a risk of collision with another vehicle. Note that when performing the PCS control, the ECU 10 may control an actuator or the like that drives a steering wheel, a seat belt, or the like in addition to controlling the brake device 32 and the warning device 33.

Next, the image G captured by camera sensor 21 used in the execution of the ACC control and the PCS control will be described.

Figure 2:
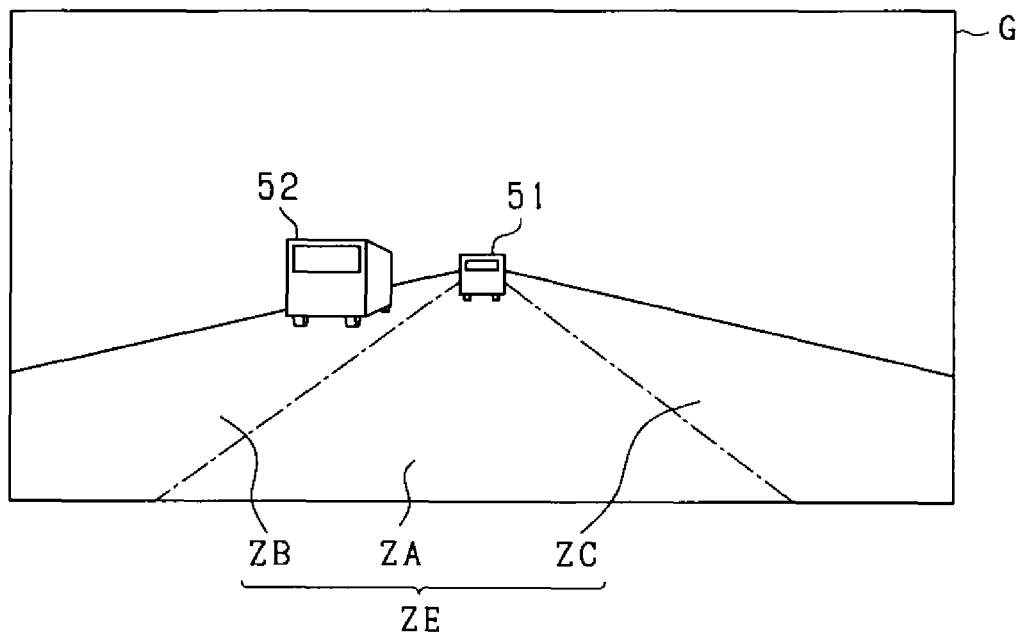
FIG. 2 is a diagram showing an image obtained by a camera sensor.

As shown in FIG. 2, in the image G, a road ZE includes three lanes ZA, ZB, ZC in which vehicles travel in the same direction. The own vehicle is traveling in the own lane ZA. The lane ZB is a left adjacent lane that is a left-hand lane adjacent to the own lane ZA, and the lane ZC is a right adjacent lane that is a right-hand lane adjacent to the own lane ZA. Left and right boundary portions of each of the lanes ZA, ZB, ZC are marking lines (lane markers) including white lines and the like, for example. In the present embodiment, it is assumed that the left and right boundary portions of each of the lanes ZA, ZB, ZC are white lines.

In the own lane ZA, there is another vehicle 51 traveling ahead of the own vehicle in the direction of travel. The ECU 10 selects another vehicle 51 as a leading vehicle in the ACC control and follows another vehicle 51.

In the left adjacent lane ZB, there is another vehicle 52 traveling ahead of the own vehicle in the direction of travel. Here, it is conceivable that another vehicle 52 may move into the own lane ZA. In this case, in order to properly perform the ACC control in which another vehicle 52 is selected as a leading vehicle or properly perform the PCS control to another vehicle 52, for example, the position of another vehicle 52 relative to the road ZE needs to be properly determined.

Thus, in the present embodiment, in order to properly determine the positional relationship between a predetermined portion of another vehicle 52 traveling in the left adjacent lane ZB and the own lane ZA, the image recognition described below is performed. Note that in the present embodiment, each of another vehicle 51 and another vehicle 52 corresponds to the "forward object."

Figure 3:
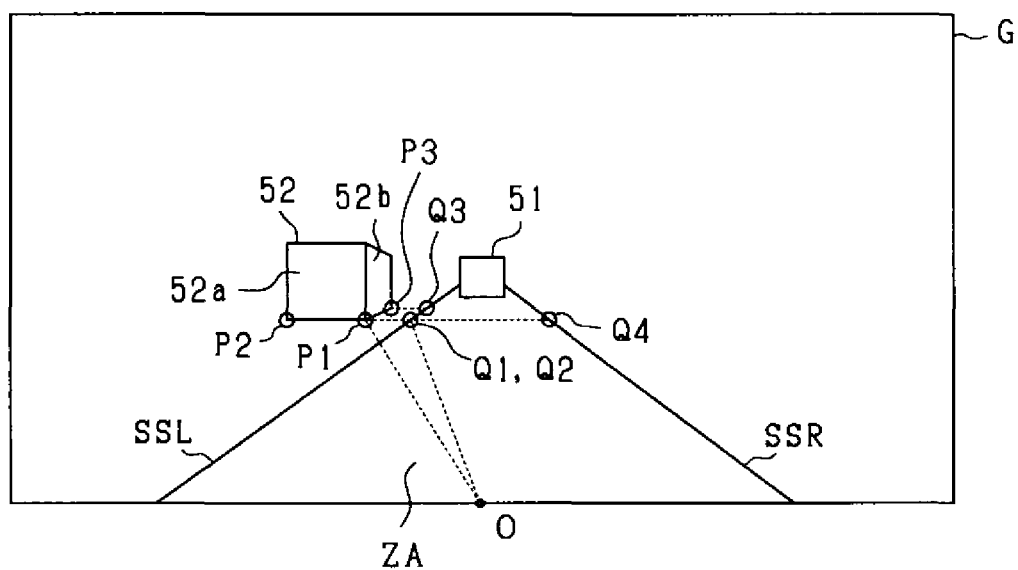
FIG. 3 is a diagram showing an image recognition result of an ECU.

FIG. 3 is a diagram showing an image recognition result of the ECU 10. In particular, a result of image recognition that involves another vehicle 52 traveling in the left adjacent lane ZB among other vehicles 51, 52 will be described in detail hereinafter.

The ECU 10 recognizes a left marking line SSL and a right marking line SSR which are left and right marking lines of the own lane ZA in the image G. Specifically, the ECU 10 recognizes the marking lines SSL, SSR as actual marking lines SS1 based on a change in luminance on the image G. There are instances where the marking lines such as white lines may be invisible or hardly visible in the image G. In this instance, the ECU 10 performs an image recognition process such as semantic segmentation and thus recognizes, as virtual marking lines SS2, the marking lines SSL, SSR that are invisible or hardly visible in the image G. For example, when the marking lines SSL, SSR cannot be recognized as the actual marking lines SS1, the ECU 10 recognizes the marking lines SSL, SSR as the virtual marking lines SS2. Note that regardless of whether the actual marking lines SS1 are recognized, the virtual marking lines SS2 may always be recognized. The ECU 10 recognizes the presence of another vehicle 51 and another vehicle 52 traveling ahead of the own vehicle.

The ECU 10 calculates a first end portion P1 at the lower right corner of a rear surface 52*a* of another vehicle 52, a second end portion P2 at the lower left corner of the rear surface 52*a* of another vehicle 52, and a third end portion P3 at the lower front corner of a right-side surface 52*b* of another vehicle 52 in the image G. Note that each of the end portions P1 to P3 corresponds to the "object point" on another vehicle 52.

For the end portions P1 to P3 calculated, the ECU 10 calculates respective boundary points Q1 to Q3 on the left marking line SSL in the image G, at positions on lines passing through the end portions P1 to P3 and extending along the width of the own vehicle (that is, in the lateral direction of the image G). The first boundary point Q1 indicates a position on the left marking line SSL that corresponds to the first end portion P1, the second boundary point Q2 indicates a position on the left marking line SSL that corresponds to the second end portion P2, and the third boundary point Q3 indicates a position on the left marking line SSL that corresponds to the third end portion P3. Note that in FIG. 3, another vehicle 52 travels in a straight line along the left adjacent lane ZB, meaning that the boundary points Q1, Q2 on the left marking line SSL match each other.

The ECU 10 calculates an angular width θ based on an origin O of the image G based on the end portions P1 to P3 of another vehicle 52 and the boundary points Q1 to Q3. The ECU 10 calculates a lateral distance W between an end portion and a boundary point based on the angular width θ. Note that in the present embodiment, the origin O is set to the center position on the lower end of the image G, but this position can be changed.

Hereinafter, one example of a method for calculating the angular width θ and the lateral width W will be described with reference to FIG. 4.

Figure 4:
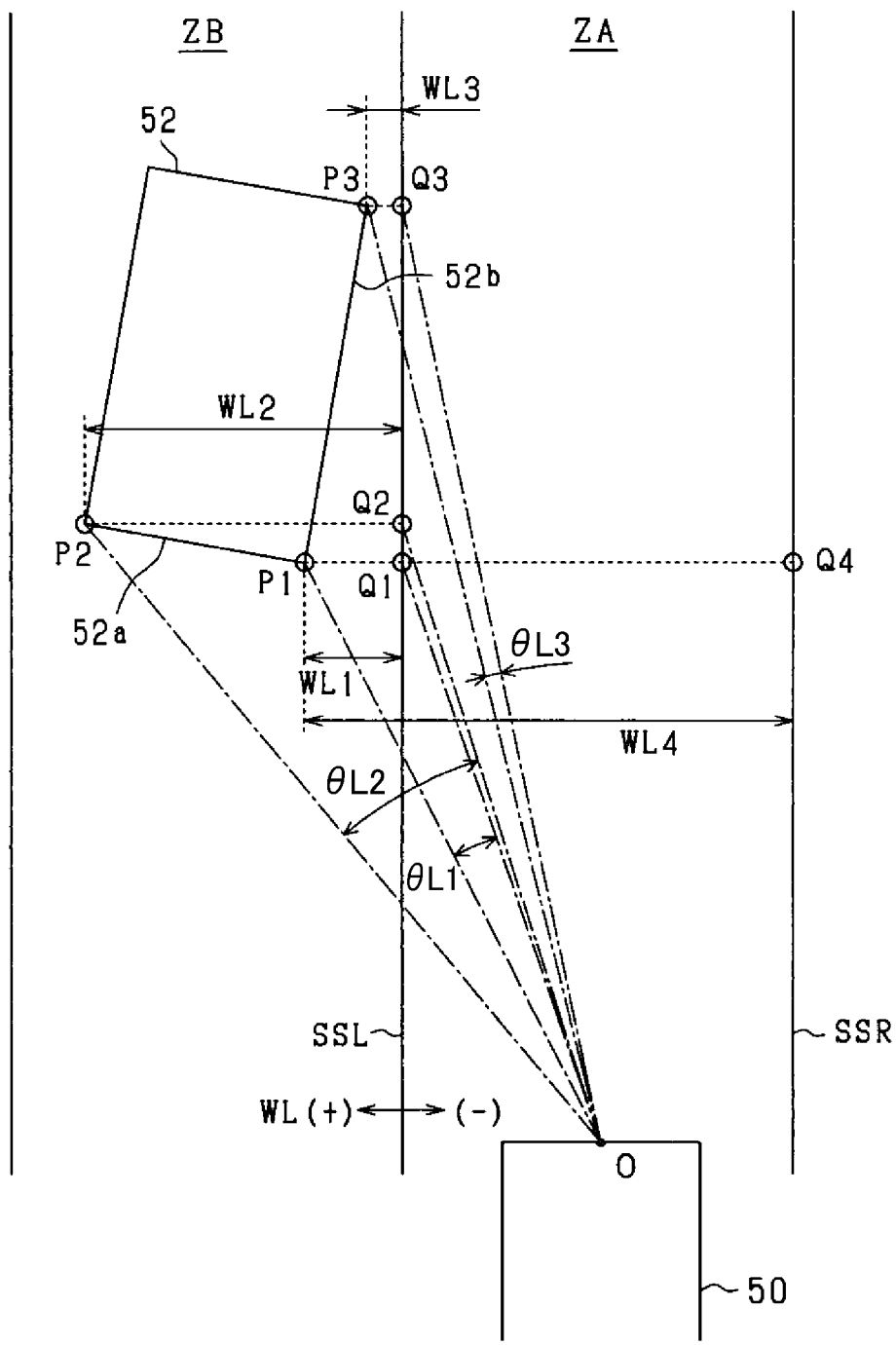
FIG. 4 is a diagram showing a method for calculating a left lateral distance.

FIG. 4 is a diagram showing a method for calculating the angular width θ and the lateral width W of another vehicle 52 traveling in the left adjacent lane ZB. In FIG. 4, elements that are the same as those in FIG. 3 described earlier are assigned the same reference signs. Note that for the sake of explanation, FIG. 4 shows another vehicle 52 veering toward the own lane.

Based on the end portions P1 to P3 of another vehicle 52 and the boundary points Q1 to Q3 on the left marking line SSL, the ECU 10 calculates left angular widths θL1 to θL3 at the end portions P1 to P3. Specifically, the ECU 10 calculates a first left angular width θL1 at the first end portion P1 and the first boundary point Q1, a second left angular width θL2 at the second end portion P2 and the second boundary point Q2, and a third left angular width θL3 at the third end portion P3 and the third boundary point Q3 with respect to the origin O.

The ECU 10 obtains distance information indicating the distance from the own vehicle 50 to each of the end portions P1 to P3 of another vehicle 52. For example, using an image lower end portion of the image G in the vertical direction as a reference position, the ECU 10 calculates the vertical length between the image lower end portion and each of the end portions P1 to P3, and calculates the distance to each of the end portions P1 to P3 as an image distance based on the vertical length.

Subsequently, the ECU 10 calculates left lateral distances WL1 to WL3 to the end portions P1 to P3 based on the left angular widths θL1 to θL3 and the image distances to the end portions P1 to P3. At this time, the ECU 10 performs the following:
  calculating the first left lateral distance WL1, which is the distance between the first end portion P1 and the first boundary point Q1, based on the first left angular width θL1 and the image distance to the first end portion P1;
  calculating the second left lateral distance WL2, which is the distance between the second end portion P2 and the second boundary point Q2, based on the second left angular width θL2 and the image distance to the second end portion P2; and
  calculating the third left lateral distance WL3, which is the distance between the third end portion P3 and the third boundary point Q3, based on the third left angular width θL3 and the image distance to the third end portion P3.

The value of each of the left lateral distances WL1 to WL3 is calculated to be negative on the own lane ZA side of the left marking line SSL and positive on the opposite side of the left marking line SSL from the own lane, for example.

It is conceivable that the image distances to the end portions P1 to P3 calculated based on the image G include a margin of error. Therefore, it is desirable that the lateral distances WL1 to WL3 calculated using the image distances be corrected using detection information from the radar sensor 22. In this case, the lateral distances WL1 to WL3 may be preferably corrected based on the image distances to the end portions P1 to P3 and the distances measured by the radar sensor 22.

The ECU 10 calculates a fourth boundary point Q4 corresponding to the first end portion P1 on the right marking line SSR in addition to the first to third boundary points Q1 to Q3 on the left marking line SSL. The fourth boundary point Q4 is on the right marking line SSR, at a position on one line passing through the first end portion P1 and extending along the width of the own vehicle 50. Using this fourth boundary point Q4, a lateral distance WL4 between the first end portion P1 and the fourth boundary point Q4 on the right marking line SSR can be calculated.

The flow for calculating the lateral distance WL to another vehicle 52 traveling in the left adjacent lane ZB has been described thus far; when another vehicle is traveling in the right adjacent lane ZC, substantially the same process can be performed to the other vehicle in the right adjacent lane ZC.

Figure 5:
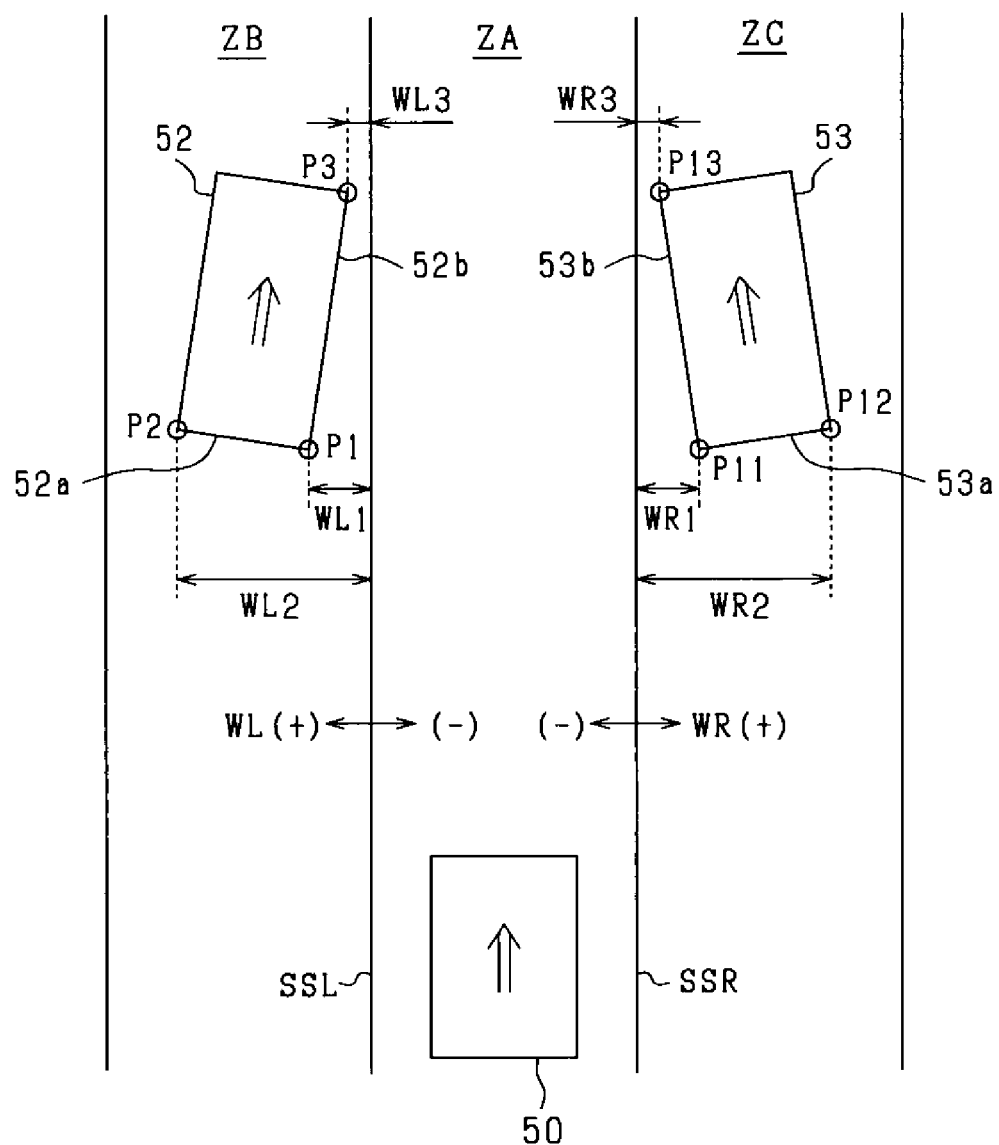
FIG. 5 is a diagram showing lateral distances to other vehicles on the left and right sides.

FIG. 5 is a diagram showing the calculated left lateral distances WL1 to WL3 to another vehicle 52 traveling in the left adjacent lane ZB and the calculated right lateral distances WR1 to WR3 to another vehicle 53 traveling in the right adjacent lane ZC.

The ECU 10 calculates a first end portion P11 at the lower left corner of a rear surface 53a of another vehicle 53 traveling in the right adjacent lane ZC and a second end portion P12 at the lower right corner of the rear surface 53a, and further calculates a third end portion P13 at the lower front corner of a left side surface 53b of another vehicle 53. Subsequently, the ECU 10 calculates, for the end portions P11 to P13, a first right lateral distance WR1, a second right lateral distance WR2, and a third right lateral distance WR3 as lateral distances to the right marking line SSR. The values of the right lateral distances WR1 to WR3 are calculated to be negative on the own lane ZA side of the right marking line SSR and positive on the opposite side of the right marking line SSR from the own lane, for example.

Although not shown in the drawings, lateral distances to another vehicle 51 traveling ahead of the own vehicle in the own lane ZA can be calculated in substantially the same manner. Specifically, the ECU 10 calculates a lateral distance from an end portion at the lower left corner of the rear surface of another vehicle 51 to the left marking line SSL and further calculates a lateral distance from an end portion at the lower right corner of the rear surface of another vehicle 51 to the right marking line SSR.

When performing the ACC control, the ECU 10 performs cut-in determination based on the lateral distances WL1 to WL3, WR1 to WR3 to determine whether any of the other vehicles 52, 53 is to be selected as a leading vehicle, in other words, whether any of the other vehicles 52, 53 has moved into the own lane ZA. At this time, using the left lateral distances WL1 to WL3, the cut-in determination is performed on another vehicle 52 traveling in the left adjacent lane ZB while, using the right lateral distances WR1 to WR3, the cut-in determination is performed on another vehicle 53 traveling in the right adjacent lane ZC.

When other vehicles 52, 53 in adjacent lanes are moving into the own lane ZA, the ECU determines, based on the positions of the end portions of other vehicles 52, 53 relative to the marking line SSL, SSR, whether said vehicles have cut in front. Specifically, when all the left lateral distances WL1 to WL3 to another vehicle 52 in the left adjacent lane ZB have positive values, the ECU 10 determines that another vehicle 52 is traveling in the left adjacent lane ZB, and in this state, when at least one of the left lateral distances WL1 to WL3 transitions to a negative value, the ECU 10 determines that another vehicle 52 has moved into the own lane ZA.

When all the right lateral distances WR1 to WR3 to another vehicle 53 in the right adjacent lane ZC have positive values, the ECU 10 determines that another vehicle 53 is traveling in the right adjacent lane ZC, and in this state, when at least one of the right lateral distances WR1 to WR3 transitions to a negative value, the ECU 10 determines that another vehicle 53 has moved into the own lane ZA.

In the present embodiment, when at least one of the left lateral distances WL1 to WL3 to another vehicle 52 transitions to a negative value and this state continues for a predetermined length of time, it is determined that another vehicle 52 has moved into the own lane ZA. Specifically, when at least one of the left lateral distances WL1 to WL3 to another vehicle 52 transitions to a negative value, a counter C measures time of duration, and based on the fact that the time (count value j) measured by the counter C reaches a predetermined value, it is determined that another vehicle 52 is to be selected as a leading vehicle in the ACC control. The same applies to another vehicle 53.

Figure 6:
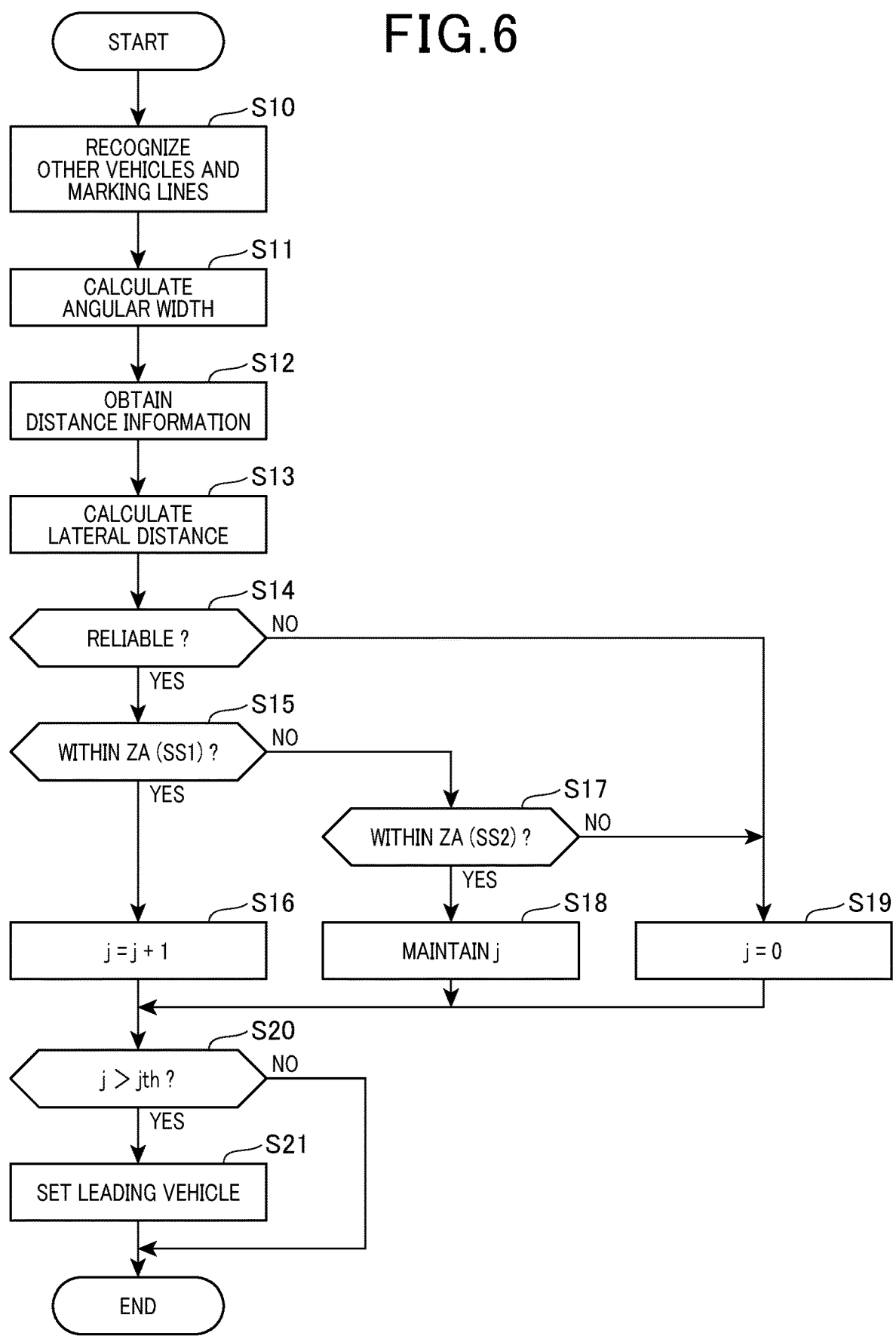
FIG. 6 is a flowchart showing a processing flow of an ACC control according to a first embodiment.

FIG. 6 shows the processing flow of the ACC control performed by the ECU 10. This processing is performed at predetermined intervals.

In Step S10, the other vehicles 52, 53 traveling in the adjacent lanes ZB, ZC and the marking lines SSL, SSR are recognized based on a camera image. When another vehicle 52 is traveling ahead of the own vehicle 50 in the left adjacent lane ZB, the presence of another vehicle 52 is recognized, and when another vehicle 53 is traveling ahead of the own vehicle 50 in the right adjacent lane ZC, the presence of another vehicle 53 is recognized. Regarding the marking lines SSL, SSR, the actual marking lines SS1 such as white lines are recognized as the marking lines SSL, SSR, and when the actual marking lines SS1 cannot be recognized, the virtual marking lines SS2 are recognized. Regardless of whether the actual marking lines are recognized, the virtual marking lines SS2 may always be recognized. In the present embodiment, Step S10 corresponds to the "recognizer."

In Step S11, the angular width θ at each end portion of other vehicles 52, 53 is calculated. Here, when there is another vehicle 52 traveling in the left adjacent lane ZB, the angular widths θL1 to θL3 at the end portions P1 to P3, which are predetermined portions of another vehicle 52, are calculated based on the end portions P1 to P3 and the boundary points Q1 to Q3 on the left marking line SSL. At this time, when the left marking line SSL is recognized as the actual marking line SS1, the angular widths θL1 to θL3 are calculated using the boundary points Q1 to Q3 on the actual marking line SS1. When the left marking line SSL is not recognized as the actual marking line SS1, but is recognized as the virtual marking line SS2, the angular widths θL1 to θL3 are calculated using the boundary points Q1 to Q3 on the virtual marking line SS2. When there is another vehicle 53 traveling in the right adjacent lane ZC, substantially the same process is performed to another vehicle 53. In the present embodiment, Step S11 corresponds to the "angular width calculator."

In Step S12, the distance information about the end portions P1 to P3 of another vehicle 52 and the end portions P11 to P13 of another vehicle 53 is obtained. This distance information includes the image distance determined from the image G and the distances measured by the radar sensor 22, for example.

In Step S13, the lateral distances W to other vehicles 52, 53 are calculated based on the angular widths θ and the distance information. Specifically, regarding another vehicle 52 in the left lane ZB, the first to third left lateral distances WL1 to WL3 from the left marking line SSL as a reference line and the lateral distance WL4 from the right marking line SSR as a reference line are calculated. Furthermore, regarding another vehicle 53 in the right lane ZC, the first to third right lateral distances WR1 to WR3 from the right marking line SSR as a reference line are calculated. In the present embodiment, Step S13 corresponds to the "lateral distance calculator."

In Step S14, whether the results of the recognition of the marking lines SSL, SSR are reliable is determined. Specifically, a distance difference ΔW is calculated, which is the difference between the lateral distance WL1 from the first boundary point Q1 on the left marking line SSL to the first end point P1 of another vehicle 52 and the lateral distance WL4 from the fourth boundary point Q4 on the right marking line SSR to the first end point P1 of another vehicle 52. Subsequently, the distance difference ΔW and a predetermined lane width Wrn of the own lane ZA (an actual lane width) are compared, and when the difference between the distance difference ΔW and the lane width Wrn is less than a predetermined difference, it is determined that the results of the recognition of the marking lines SSL, SSR are reliable. On the other hand, when the difference between the distance difference ΔW and the lane width Wrn is not less than the predetermined difference, it is determined that the results of the recognition of the marking lines SSL, SSR are not reliable. In this case, the difference between the distance difference ΔW and the lane width Wrn being less than the predetermined difference, in other words, the distance difference ΔW having a value equivalent to the lane width of the own lane ZA, means that the marking lines SSL, SSR are properly recognized. Note that the lane width Wrn may have a predetermined value or may be determined for each road.

In the present embodiment, the cut-in determination (leading vehicle determination) based on the lateral distances WL1 to WL3, WR1 to WR3 is performed on the condition that the difference between the distance difference ΔW and the lane width Wrn is less than the predetermined difference, in other words, on the condition that it is determined that the results of the recognition of the marking lines SSL, SSR are reliable. Therefore, when it is determined in Step S14 that the results are reliable, the processing proceeds to Step S15 in which the following cut-in determination is performed. On the other hand, when it is determined in Step S14 that the results are not reliable, the processing proceeds to Step S19. In Step S19, the count value j of the counter C that is used in the cut-in determination is reset.

In Step S15, whether the other vehicles 52, 53 are attempting to move into the own lane ZA is determined based on the lateral distances WL1 to WL3, WR1 to WR3 to the other vehicles 52, 53 that have been calculated using the boundary points on the actual marking lines SS1. Specifically, when the left marking line SSL is recognized as the actual marking line SS1, it is determined whether any of the left lateral distances WL1 to WL3 to the end portions P1 to P3 of another vehicle 52 that have been calculated based on the left marking line SSL has a negative value. In this case, when all the left lateral distances WL1 to WL3 have positive values, a negative determination is made in Step S15, and when at least one of the left lateral distances WL1 to WL3 has a negative value, an affirmative determination is made in Step S15.

Furthermore, when the right marking line SSR is recognized as the actual marking line SS1, it is determined whether any of the right lateral distances WR1 to WR3 to the end points P11 to P13 of another vehicle 53 that have been calculated based on the right marking line SSR has a negative value. In this case, when all the right lateral distances WR1 to WR3 have positive values, a negative determination is made in Step S15, and when at least one of the right lateral distances WR1 to WR3 has a negative value, an affirmative determination is made in Step S15.

When an affirmative determination is made in Step S15, the processing proceeds to Step S16. When a negative determination is made in Step S15, the processing proceeds to Step S17.

Note that, for example, when another vehicle 52 attempts to move from the left adjacent lane ZB into the own lane ZA, a part of the left marking line SSL may be covered and hidden by another vehicle 52 and thus become invisible. In this case, when the left marking line SSL that has become invisible is only a part hidden by another vehicle 52, interpolation may be preferably performed using the left marking line SSL that is visible, and the boundary points Q1 to Q3 on the actual marking line SS1 may be preferably calculated using the actual marking line SS1 resulting from the interpolation. When the marking lines SSL, SSR are not recognized as the actual marking lines SS1 in the range between the own vehicle 50 and the other vehicles 52, 53, for example, a negative determination may be preferably made in Step S15.

In Step S16, the count value j of the counter C is incremented. In the present embodiment, 1 is added to the count value j. The counter C performs separate counting operations on another vehicle 52 in the left adjacent lane ZB and another vehicle 53 in the right adjacent lane ZC.

In Step S17, whether the other vehicles 52, 53 are attempting to move into the own lane ZA is determined based on the lateral distances WL1 to WL3, WR1 to WR3 to the other vehicles 52, 53 that have been calculated using the boundary points on the virtual marking lines SS2 instead of the boundary points on the actual marking lines SS1. Specifically, when the left marking line SSL is recognized as the virtual marking line SS2 instead of the actual marking line SS1, it is determined whether any of the left lateral distances WL1 to WL3 to the end portions P1 to P3 of another vehicle 52 that have been calculated based on the left marking line SSL has a negative value. In this case, when all the left lateral distances WL1 to WL3 have positive values, a negative determination is made in Step S17, and when at least one of the left lateral distances WL1 to WL3 has a negative value, an affirmative determination is made in Step S17.

Furthermore, when the right marking line SSR is recognized as the virtual marking line SS2 instead of the actual marking line SS1, it is determined whether any of the right lateral distances WR1 to WR3 to the end points P11 to P13 of another vehicle 53 that have been calculated based on the right marking line SSR has a negative value. In this case, when all the right lateral distances WR1 to WR3 have positive values, a negative determination is made in Step S17, and when at least one of the right lateral distances WR1 to WR3 has a negative value, an affirmative determination is made in Step S17.

When an affirmative determination is made in Step S17, the processing proceeds to Step S18. In Step S18, the count value j of the counter C is maintained. When a negative determination is made in Step S17, the processing proceeds to Step S19.

Steps S15, S17 involve an end portion determination condition (predetermined condition) for determining whether the lateral distances WL1 to WL3, WR1 to WR3 to the end points of the other vehicles 52, 53 are within a predetermined range. Steps S15 to S18 show that there is a difference in the form of implementation of the cut-in determination in which the end portion determination condition is used between when the actual marking lines SS1 are recognized and the lateral distances WL1 to WL3, WR1 to WR3 are calculated based on the actual marking lines SS1 and when the virtual marking lines SS2 are recognized instead of the actual marking lines SS1 and the lateral distances WL1 to WL3, WR1 to WR3 are calculated based on the virtual marking lines SS2.

In Step S20, it is determined whether the count value j of the counter C is greater than a predetermined value jth. When an affirmative determination is made in Step S20, the processing proceeds to Step S21. In Step S21, out of another vehicle 52 and another vehicle 53, another vehicle for which the count value j has become greater than the predetermined value jth is determined as a leading vehicle in the ACC control. On the other hand, when a negative determination is made in Step S20, this processing ends.

The counter C can be configured to add, in Step S16, a predetermined number (for example, 2) to the count value j of the counter C and add, in Step S18, a number (for example, 1) less than the predetermined number to the count value j of the counter C.

Figure 7:
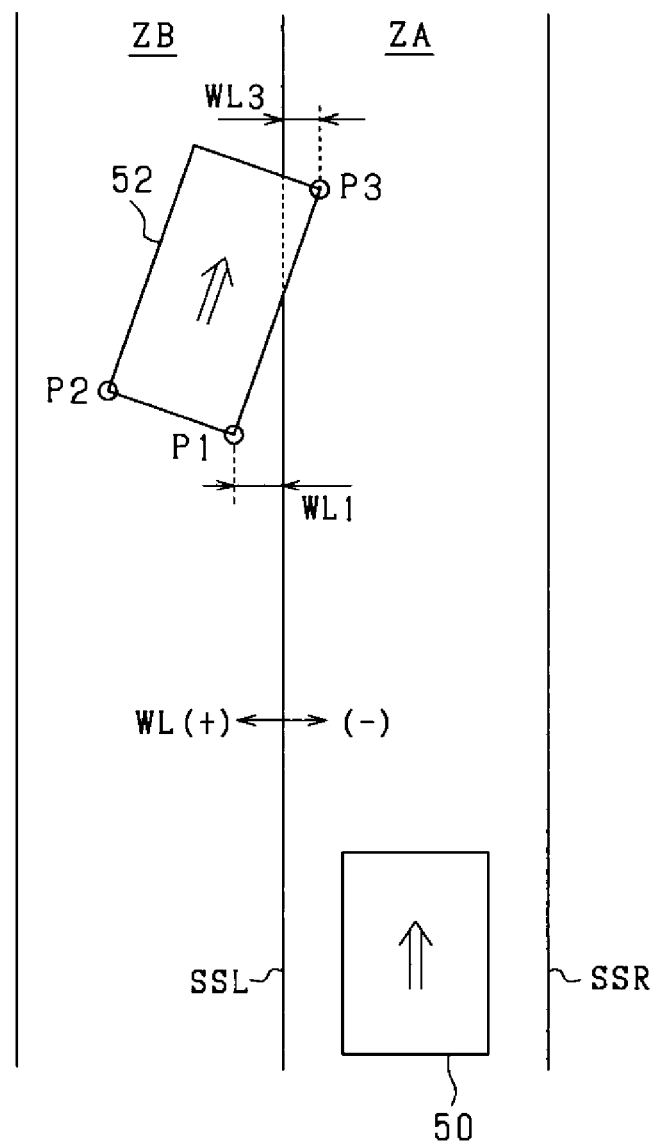
FIG. 7 is a diagram showing one example of position detection using a lateral distance.

Next, one example of the ACC control will be described with reference to FIG. 7. In FIG. 7, elements that are the same as those in FIG. 7 described earlier are assigned the same reference signs. The case where another vehicle 52 moves from the left adjacent lane ZB into the own lane ZA will be described hereinbelow.

It is conceivable that in the movement of another vehicle 52 from the left adjacent lane ZB into the own lane ZA, another vehicle 52 may move into the own lane ZA at an angle with respect to the direction of travel of the own vehicle 50, as illustrated in FIG. 7. In this case, before the first left lateral distance WL1 to the first end portion P1 of the rear surface of another vehicle 52 transitions from a positive value to a negative value, the left lateral distance WL3 at a side front-end portion of another vehicle 52 transitions from a positive value to a negative value. In other words, the third end portion P3 moves into the own lane ZA before the first end portion P1 moves into the own lane ZA. Subsequently, when the duration of a state in which the left lateral distance WL3 has a negative value, that is, the duration of a state in which the third end portion P3 is in the own lane ZA, reaches a predetermined length of time, it is determined that another vehicle 52 is determined as a leading vehicle in the ACC control. Note that the road ZE may have been configured so that the adjacent lane merges into the own lane ZA. This is the case when the number of lanes on the road is reduced or when the lane is a merging lane (rampway) on a freeway or the like, for example. In this case, the above-described cut-in determination may be preferably performed when another vehicle is moving from an adjacent lane that is a merging lane.

Furthermore, when another vehicle 52 is cutting in front of the own vehicle 50, the ECU performs the PCS control on the other vehicle 52 based on the left lateral distances WL1 to WL3 to the end portions P1 to P3. Specifically, the ECU 10 performs the PCS control shown in FIG. 8.

Figure 8:
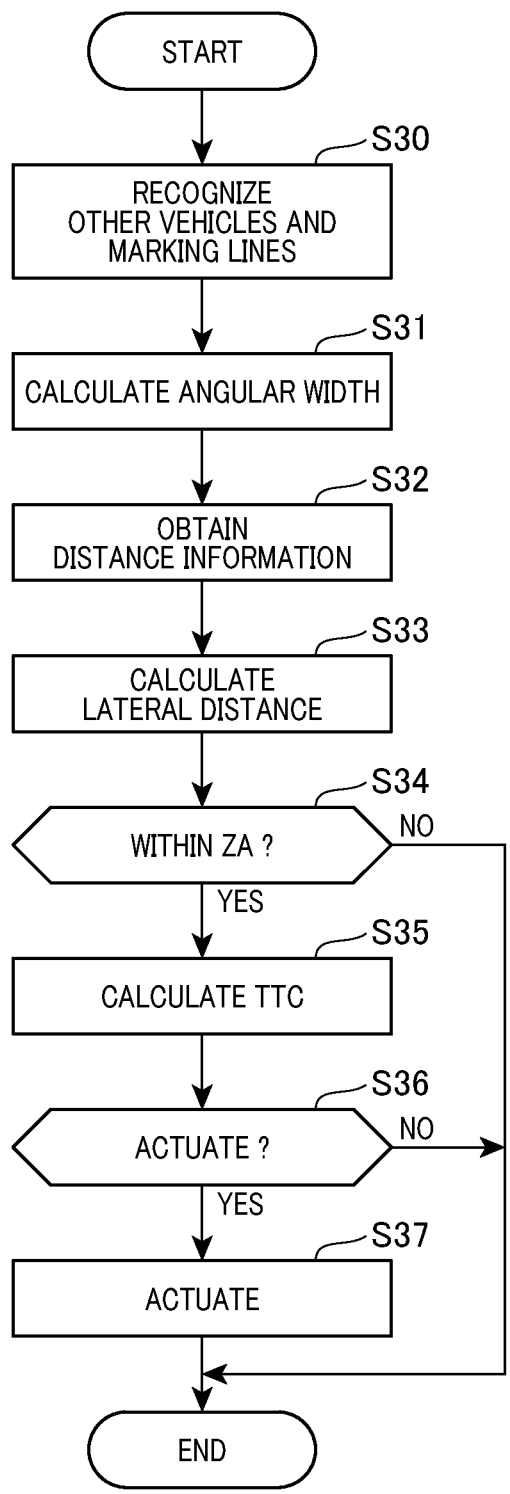
FIG. 8 is a flowchart showing a processing flow of a PCS control according to the first embodiment.

In FIG. 8, in Steps S30 to S33, processes that are substantially the same as those in Steps S10 to S13 in FIG. 6 are performed. Briefly, in Step S30, other vehicles 52, 53 traveling in the adjacent lanes ZB, ZC and the marking lines SSL, SSR are recognized, and in Step S31, angular widths θ at the end portions of other vehicles 52, 53 are calculated. In Step S32, the distance information about the end portions of other vehicles 52, 53 is obtained. In Step S33, the lateral distances W to the end portions of other vehicles 52, 53 are calculated based on the angular widths θ and the distance information.

Subsequently, in Step S34, whether other vehicles 52, 53 are attempting to move into the own lane ZA is determined based on the lateral distances W to the end portions of other vehicles 52, 53. For example, in the case where another vehicle 52 moves into the own lane ZA, the third end portion P3 (front right end portion) of another vehicle 52 moves into the own lane ZA earlier than the other end portions do. Therefore, when the left lateral distance WL3 to the third end portion P3 transitions from a positive value to a negative value, another vehicle 52 is regarded as moving into the own lane ZA, and a positive determination is made in Step S34.

Note that the lateral distance W used in Step S34 may either be obtained through the calculation based on the actual marking line SS1 or be obtained through the calculation based on the virtual marking line SS2.

In Step S35, TTC is calculated by dividing the linear distance from the own vehicle 50 to the end portions of other vehicles 52, 53 determined as having moved into the own lane ZA by the speeds of other vehicles 52, 53 relative to the own vehicle 50. In Step S36, the TTC of other vehicles 52, 53 and a predetermined threshold value are compared, and whether to actuate the brake device 32, the warning device 33, or the like is determined. Subsequently, when an affirmative determination is made in Step S36, the processing proceeds to Step S37 in which the brake device 32, the warning device 33, or the like is actuated in order to avoid collision with any of the other vehicles that are subject to the control.

In essence, in FIG. 8, among the end portions of other vehicles 52, 53, an end portion that has moved into the own lane ZA is determined, and the actuation status of the brake device 32, the warning device 33, or the like is controlled based on the TTC calculated for said end portion.

Note that in FIG. 8, the process of determining whether the results of the recognition of the marking lines SSL, SSR are reliable (Step S14) can also be performed, similar to FIG. 6.

According to the present embodiment described above in detail, the following advantageous effects are obtained.

In the image G, the angular widths θ at the end portions of other vehicles 52, 53 and the boundary points on the marking lines SSL, SSR on one line extending along the width of the own vehicle 50 are calculated, and the lateral widths W to the end portions of other vehicles 52, 53 are calculated based on the angular widths θ and the distance information indicating the distances to the end portions of other vehicles 52, 53. Subsequently, the traveling support control to other vehicles 52, 53 is performed based on the lateral distances.

With the above-described configuration, the positions of other vehicles 52, 53 with relative to the marking lines SSL, SSR can be properly determined at desired positions. In this case, even when the predetermined portions to be detected on other vehicles 52, 53 vary every time depending on a travel scene or the like, the position of a desired portion can be properly detected. Thus, the positions of other vehicles 52, 53 can be properly detected and as a result, the traveling support control can be properly performed.

When there is another vehicle ahead of the own vehicle, the ACC control, the PCS control, or the like is performed after the rear surface of the other vehicle is recognized; however, in the case where another vehicle traveling in an adjacent lane moves into the own lane ZA, the other vehicle is oriented at an angle, meaning that a front-end portion of the other vehicle moves into the own lane ZA earlier than the rear surface of the other vehicle does. Regarding this point, the lateral distances W to the positions of own-vehicle-end lateral end portions of the rear surfaces of other vehicles 52, 53 traveling in adjacent lanes and the positions of the front-end portions of own-vehicle-end side surfaces of other vehicles 52, 53 are calculated, and the traveling support control to other vehicles 52, 53 is performed based on the lateral distances W. In particular, in the ACC control, whether to select other vehicles 52, 53 as leading vehicles is determined based on the positions of the front-end portions of the own-vehicle-end side surface of other vehicles 52, 53 (the lateral distances W). Thus, as compared to the case where the traveling support control is performed based on the results of the recognition of the rear surfaces of other vehicles 52, 53, measures in the traveling support control that deal with other vehicles 52, 53 can be taken early and as a result, the traveling support control can be optimized.

The leading vehicle determination based on the lateral distances is performed on the condition that the difference between the predetermined lane width Wrn (the actual lane width) of the own lane ZA and the distance difference ΔW between the lateral distance WL1 from the boundary point Q1 on the left marking line SSL to the first end point P1 of another vehicle 52 and the lateral distance WL4 from the boundary point Q4 on the right marking line SSR to the first end point P1 of another vehicle 52 is less than the predetermined difference. Thus, other vehicles 52, 53 can be determined as leading vehicles with increased accuracy.

The implementation mode of the leading vehicle determination is made different depending on whether the actual marking lines SS1 are recognized and the lateral distances are calculated based on the actual marking lines SS1 or the virtual marking lines SS2 are recognized instead of the actual marking lines SS1 and the lateral distances are calculated based on the virtual marking lines SS2. Specifically, when the actual marking lines SS1 are recognized and the lateral distances are calculated based on the actual marking lines SS1, the count value j of the counter C which measures time of duration in which at least a part of other vehicles 52, 53 is in the own lane ZA is incremented. On the other hand, when the virtual marking lines SS2 are recognized instead of the actual marking lines SS1 and the lateral distances calculated based on the virtual marking lines SS2 are within the predetermined range, the count value j of the counter C is maintained or is incremented by a number less than the predetermined number.

Thus, when it is continuously determined based on the actual marking lines SS1, which are recognized with high reliability, that other vehicles 52, 53 have cut in front, it is determined that other vehicles 52, 53 are selected as leading vehicles in the ACC control. Therefore, the occurrence of erroneous determination in which other vehicles 52, 53 are selected as leading vehicles can be reduced.

Second Embodiment

Figure 9:
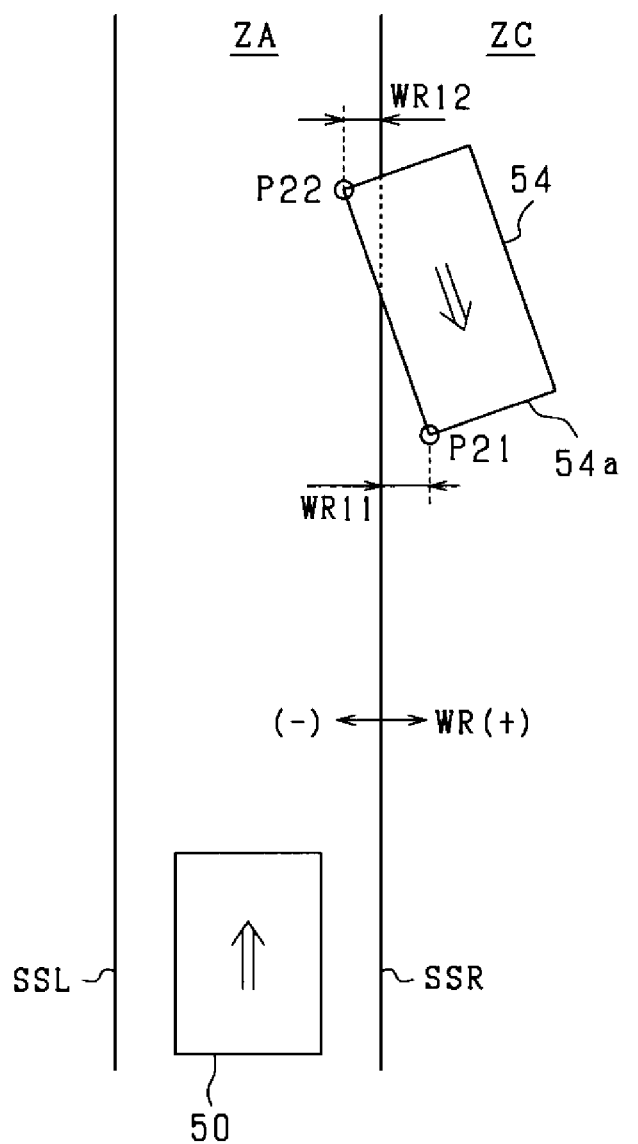
FIG. 9 is a diagram showing one example of position detection according to a second embodiment.

Hereinafter, a second embodiment will be described focusing on differences from the first embodiment. In the present embodiment, assuming a situation where an oncoming vehicle 54 traveling in the direction opposite to the direction of travel of the own vehicle 50 is present in front of the own vehicle 50 as shown in FIG. 9, the PCS control that is performed to the oncoming vehicle 54 will be described. FIG. 9 assumes a situation where the oncoming vehicle 54 swerves into the own lane ZA after rounding a sharp curve and then travels back to the right adjacent lane ZC, for example; at this time, the oncoming vehicle 54 may travel at an angle toward the right adjacent lane ZC with respect to the direction of travel of the own vehicle 50.

The PCS control that is performed to this oncoming vehicle 54 will be described with reference back to the flowchart shown in FIG. 8 described earlier.

In the present embodiment, in Steps S30 to S33 in FIG. 8, lateral distances W to end portions P21, P22 (refer to FIG. 9) which are object points on the oncoming vehicle 54 are calculated. Specifically, the ECU 10 calculates the front right end portion P21 of a front surface 54*a* of the oncoming vehicle 54 and the rear right end portion P22 of an own-vehicle-end side surface of the oncoming vehicle 54, and calculates lateral distances WR11, WR12 to these end portions P21, P22 from the right marking line SSR as a reference line by using the method already described. Note that the calculation of the lateral distance to the front left end portion on the front surface 54*a* of the oncoming vehicle 54 is arbitrary.

Subsequently, in Step S34, whether the oncoming vehicle 54 is in the own lane ZA is determined based on lateral distances WR21, WR22 to the end portions P21, P22 of the oncoming vehicle 54. In the case where the oncoming vehicle 54 moves to the right adjacent lane ZC from the state in which the oncoming vehicle 54 is in the own lane ZA, a rear vehicle part of the oncoming vehicle 54 moves to the right adjacent lane ZC later than a front vehicle part of the oncoming vehicle 54 does. In this case, in the state in which the oncoming vehicle 54 is in the own lane ZA, both the lateral distance WR21 to the front right end portion P21 of the oncoming vehicle 54 and the lateral distance WR22 to the rear right end portion P22 have negative values, or out of the lateral distances WR21, WR22, only the lateral distance WR22 to the rear right end portion P22 has a negative value. Conversely, when the oncoming vehicle 54 moves to the right adjacent lane ZC, both the lateral distance WR21 to the front right end portion P21 of the oncoming vehicle 54 and the lateral distance WR22 to the rear right end portion P22 have positive values.

Therefore, when at least one of the lateral distances WR21, WR22 has a negative value, an affirmative determination is made in Step S34, and the processing proceeds to Step S35. When both the lateral distances WR21, WR22 have positive values, a negative determination is made in Step S34, and this processing ends.

In Steps S35 to S37, TTC is calculated for each end portion of the oncoming vehicle 54 that stays in the own lane ZA, and the brake device 32, the warning device 33, or the like is actuated, as appropriate, based on the TTC.

According to the present embodiment described above in detail, the following advantageous effects are obtained.

In the case were the oncoming vehicle 54 leaves from the own lane ZA, even when the front-end portion of the oncoming vehicle 54 that is located on the own lane ZA side leaves from an area in front of the own vehicle 50, the rear end portion of the oncoming vehicle 54 that is located on the own lane ZA side may be in front of the own vehicle 50. Regarding this point, the lateral distances W to the position of an own-vehicle-end lateral end portion of the front surface of the oncoming vehicle 54 and the position of a rear end portion of the own-vehicle-end side surface of the oncoming vehicle 54 are calculated, and the PCS control to the oncoming vehicle 54 is performed based on these lateral distances W. Thus, as compared to the case where the PCS control is performed based on the result of the recognition of the front surface of the oncoming vehicle 54, the probability of collision with the oncoming vehicle 54 can be reduced.

Third Embodiment

Hereinafter, a third embodiment will be described focusing on differences from the first embodiment. In the present embodiment, the ECU 10 performs the PCS control based on the lateral distances from the forward object located ahead of the own vehicle in the direction of travel to left and right boundary portions of a road on which the own vehicle is traveling. The present embodiment assumes that the forward object is a person or a bicycle, for example.

Figure 10:
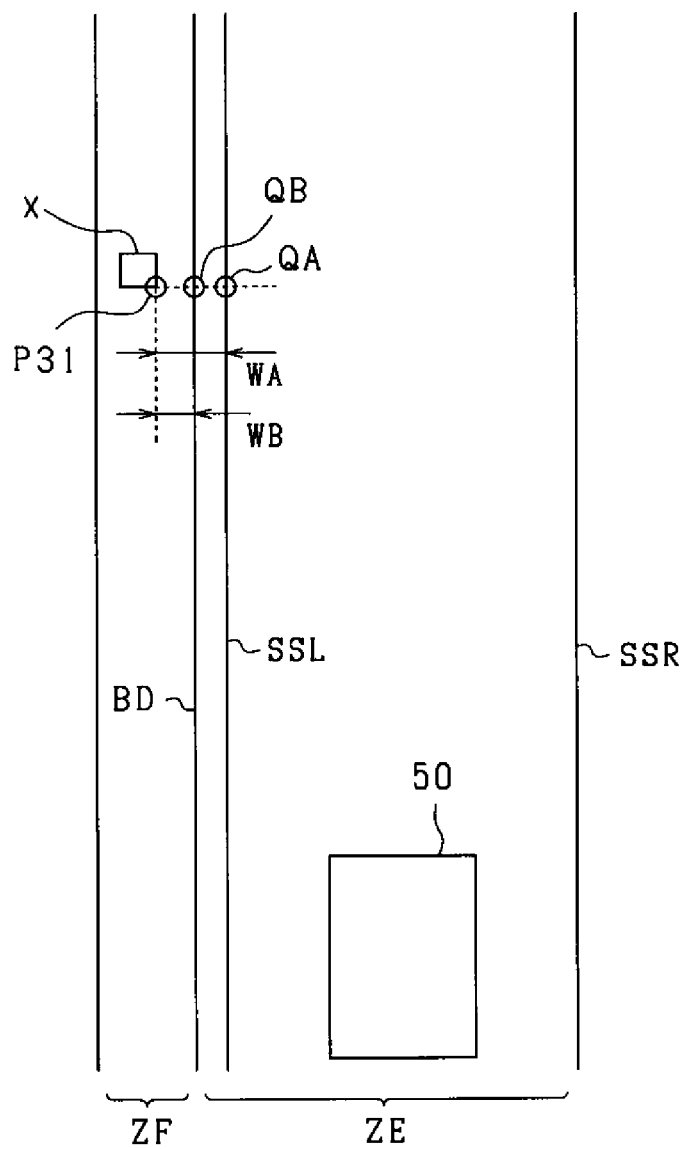
FIG. 10 is a diagram showing one example of position detection according to a third embodiment.

The present embodiment assumes that a traffic lane defined by the left and right marking lines SSL, SSR is provided on the road ZE which is a roadway and a boundary marking object BD is provided on the left side of the left marking line SSL as a left boundary portion of the road ZE, as shown in FIG. 10. The boundary marking object BD, which is a curb, a guard rail, or a gutter, for example, is provided parallel to the left marking line SSL of the road ZE and located on the outside of the left marking line SSL. The left side of the boundary marking object BD is, for example, a sidewalk ZF. Note that the area between the left marking line SSL and the boundary marking object BD on the road ZE is a road shoulder area.

There are instances where, on the road ZE, the marking lines SSL, SSR such as white lines may be hardly visible due to deterioration or the like or the marking lines SSL, SSR may not be present. In these instances, if the marking lines SSL, SSR are unrecognizable, there is a concern that the PCS control will no longer be properly performed to a forward object located around a road boundary portion. In FIG. 10, there is an object X that is a person or a bicycle on the left side of the road ZE; when the left marking line SSL is unrecognizable, there is a concern that the PCS control will no longer be properly performed to the object X.

Thus, in the present embodiment, the left and right marking lines SSL, SSR and the boundary marking object BD, which is a road boundary extending along the road ZE and being different from the marking lines SSL, SSR, are recognized as left and right boundary portions of the road ZE. The implementation mode of the collision damage reduction control to be performed based on the lateral distances W between the forward object (the object X) and the road boundary portion is changed depending on whether the marking lines SSL, SSR are recognized as boundary portions or the boundary marking object BD is recognized as a boundary portion.

Figure 11:
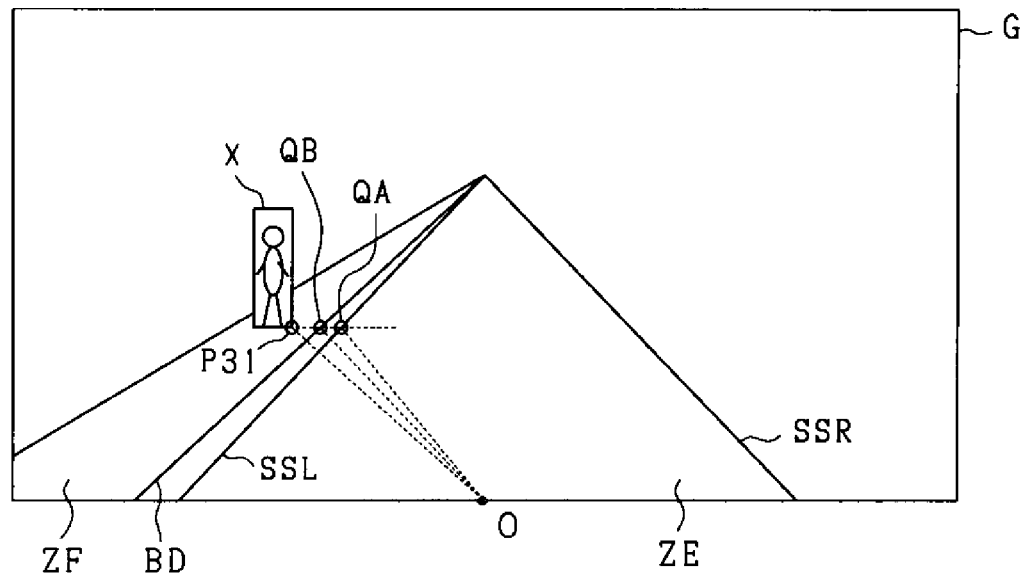
FIG. 11 is a diagram showing one example of position detection according to the third embodiment.

The lateral distances W to the object X can be calculated by the method described with reference to FIG. 4, which will now be described briefly. FIG. 11 is the image G showing a situation where there is the object X on the sidewalk ZF. FIG. 11 shows the object X, the left and right marking lines SSL, SSR, and the boundary marking object BD recognized by the ECU 10. Note that the marking lines SSL, SSR may be either the actual marking lines or the virtual marking lines. It is assumed that the boundary marking object BD is a three-dimensional object such as a guard rail; in FIG. 11, a position at which the boundary marking object BD is projected on a road surface is shown as a road surface projection line.

The ECU 10 calculates an object point P31 indicating a predetermined portion (for example, a lower right end portion) of the object X, a boundary point QA on the left marking line SSL, and a boundary point QB on the road surface projection line of the boundary marking object BD that are on one line extending along the width of the own vehicle in the image G, and further calculates the angular widths θ at the object point P31 and boundary points QA, QB based on the origin O. Furthermore, the ECU 10 calculates the lateral distances W between the object X and the marking lines SSL, SSR based on the angular widths θ and the distance information indicating the distances to the object point P31, and further calculates the lateral distance W between the object X and the boundary marking object BD.

Note that in the image G, when the marking lines SSL, SSR are recognized, a lateral distance WA is calculated based on the marking lines SSL, SSR as the lateral distance W, and when the marking lines SSL, SSR are not recognized, but the boundary marking object BD is recognized instead, a lateral distance WB is calculated based on the boundary marking object BD as the lateral distance W. Note that regardless of whether the marking lines SSL, SSR are recognized or not, the lateral distance WB may always be calculated based on the boundary marking object BD.

When calculating the TTC based on the distance from the own vehicle 50 to the object X in the PCS control, the ECU 10 changes the implementation mode of the PCS control depending on whether the lateral position of the object X has been determined as a position relative to the marking lines SSL, SSR or determined as a position relative to the boundary marking object BD.

Specifically, the ECU 10 calculates the TTC by dividing the linear distance from the own vehicle 50 to the object X by the speed of the object X relative to the own vehicle 50. Furthermore, when the position of the object X has been determined as a position relative to the marking lines SSL, SSR, the ECU 10 makes a correction to increase the TTC based on the lateral distance WA, and the position of the object X has been determined as a position relative to the boundary marking object BD, the ECU 10 makes a correction to increase the TTC based on the lateral distance WB.

Figure 12:
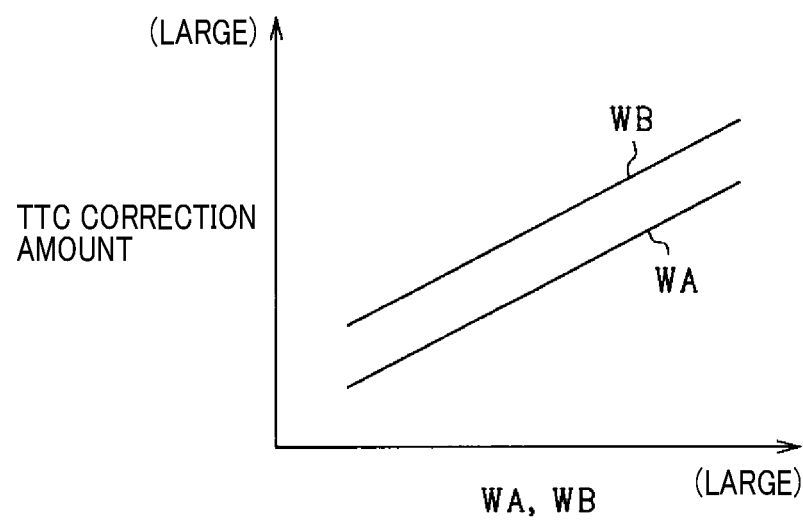
FIG. 12 is a diagram showing the relationship between a lateral distance and a TTC correction amount.

The following is a supplemental description of the TTC correction. The ECU 10 calculates a TTC correction amount based on the lateral distances WA, WB using the relationship shown in FIG. 12, for example. The lateral distance WA away from the own vehicle with respect to the marking lines SSL, SSR has a positive value, and the lateral distance WB away from the own vehicle with respect to the boundary marking object BD has a positive value. According to FIG. 12, when the TTC correction amount calculated based on the lateral distance WA and the TTC correction amount calculated based on the lateral distance WB are compared, the latter is greater.

FIG. 13 shows the processing flow of the PCS control performed by the ECU 10. This processing is performed at predetermined intervals.

In Step S40, the object X, the marking lines SSL, SSR, and the boundary marking object BD are recognized based on a camera image.

In Step S41, the angular width θ at the object point P31 on the object X is calculated. When the marking lines SSL, SSR are recognized as boundary portions of the road, the angular widths θ are calculated based on the object point P31 on the object X and the boundary point QA on the marking lines SSL, SSR. When the marking lines SSL, SSR are not recognized, but the boundary marking object BD is recognized as a boundary portion of the road, the angular widths θ are calculated based on the object point P31 on the object X and the boundary point QB on the boundary marking object BD (the road surface projection line).

In Step S42, the distance information about the object point P31 on the object X is obtained. This distance information includes the image distance determined from the image G and the distances measured by the radar sensor 22, for example.

In Step S43, the lateral distances W to the object X are calculated based on the angular widths θ and the distance information. Specifically, regarding the object point P31, the lateral distance WA to the boundary point QA on the marking lines SSL, SSR and the lateral distance WB to the boundary points QB on the boundary marking object BD (the road surface projection line) are calculated.

In Step S44, it is determined whether the position of the object X has been determined as a position relative to the marking lines SSL, SSR, in other words, whether the lateral distance WA has been calculated based on the marking lines SSL, SSR. Subsequently, when the lateral distance WA has been calculated based on the marking lines SSL, SSR, the processing proceeds to Step S45, and when the lateral distance WA has not been calculated based on the marking lines SSL, SSR, the processing proceeds to Step S46.

In Step S45, the TTC is calculated based on the linear distance between the own vehicle 50 and the object X and the speed of the object X relative to the own vehicle 50 and furthermore, a correction is made to increase the TTC based on the lateral distance WA. Subsequently, the brake device 32, the warning device 33, or the like is actuated, as appropriate, based on the corrected TTC.

In Step S46, it is determined whether the position of the object X has been determined as a position relative to the boundary marking object BD, in other words, whether the lateral distance WB has been calculated based on the boundary marking object BD. Subsequently, when the lateral distance WB has been calculated based on the boundary marking object BD, the processing proceeds to Step S47, and when the lateral distance WB has not been calculated based on the boundary marking object BD, the processing ends.

In Step S47, the TTC is calculated based on the linear distance between the own vehicle 50 and the object X and the speed of the object X relative to the own vehicle 50 and furthermore, a correction is made to increase the TTC based on the lateral distance WB. Subsequently, the brake device 32, the warning device 33, or the like is actuated, as appropriate, based on the corrected TTC.

According to the present embodiment described above in detail, the following advantageous effects are obtained.

The boundary marking object BD different from the marking lines SSL, SSR is recognized as a boundary portion of the road ZE, and the position of the forward object located around the road boundary portion is determined based on the boundary marking object BD. Thus, even in a situation in which the marking lines SSL, SSR of the road ZE cannot be recognized, the position of the forward object located around the road boundary portion can be determined, as appropriate, and as a result, the PCS control can be properly performed.

The road ZE covers a wide area including a road shoulder area; therefore, it is not desirable to equally treat the PCS control performed when the position of the forward object is determined based on the marking lines SSL, SSR and the PCS control performed when the position of the forward object is determined based on the boundary marking object BD located on the outside of the road shoulder area. Regarding this point, the implementation mode of PCS control based on the lateral distances is made different depending on whether the marking lines SSL, SSR are recognized as boundary portions or the boundary marking object BD is recognized as a boundary portion instead of the marking lines SSL, SSR. Thus, the PCS control can be properly performed depending on the positions of the marking lines SSL, SSR, and the boundary marking object BD on the road ZE.

Other Embodiments

Note that the above-described embodiments may be implemented with the following changes.

In the first embodiment, the ECU 10 uses, as determination target values, the left lateral distances WL1 to WL3 to another vehicle 52 traveling in the left adjacent lane ZB, but this may be changed. For example, in Steps S15, S17 shown in FIG. 6, among the left lateral distances WL1 to WL3, the left lateral distances WL1, WL3 may be used as determination target values, or only the left lateral distance WL3 may be used as a determination target value. The same applies to another vehicle 53 traveling in the right adjacent lane ZC.

In the first embodiment, the distinction between whether the marking lines SSL, SSR have been recognized as the actual marking lines SS1 or recognized as the virtual marking lines SS2 may be removed. In this case, in Step S15 shown in FIG. 6, regardless of whether the marking lines SSL, SSR have been recognized as the actual marking lines SS1 or the virtual marking lines SS2, whether other vehicles 52, 53 have cut in front is determined based on the lateral distances W calculated using the boundary points on the marking lines SSL, SSR. Note that in FIG. 6, the processes in Steps S17, S18 are removed.

In the third embodiment, the distinction between whether the position of the object X has been determined as a position relative to the marking lines SSL, SSR or determined as a position relative to the boundary marking object BD may be removed. In this case, in Step S44 shown in FIG. 13, regardless of whether the position of the object X has been recognized based on the marking lines SSL, SSR or the boundary marking object BD, the TTC correction amount is calculated based on the lateral distances calculated using the boundary points on the boundary portion. Note that in FIG. 13, the processes in Steps S46, S47 are removed.

In Step S18 shown in FIG. 6, when the marking lines SSL, SSR are recognized as the virtual marking lines SS2 instead of the actual marking lines SS1, the count value j may be reset to zero at a point in time when the duration of said state reaches a predetermined length of time.

In the first embodiment, in the selection of another vehicle 52 as a leading vehicle in the ACC control, the transition of the third left lateral distance WL3 from a positive value to a negative value is determined, but the determination threshold value is not limited to zero. For example, the ECU 10 may set a negative-side predetermined value that is a negative value and determine whether the third left lateral distance WL3 is greater than or equal to the negative-side predetermined value. Furthermore, for example, the ECU 10 may set a positive-side predetermined value that is a positive value and determine whether the third left lateral distance WL3 is less than or equal to the positive-side predetermined value.

A stereo camera may be used as the camera sensor 21. Furthermore, as a distance measurement device, a distance measurement device that measures a distance via vehicle-to-vehicle communication, a laser sensor, or the like may be used instead of the radar sensor 22.

The traveling support device that have been described in the present disclosure may be implemented by a dedicated computer provided to include memory and a processor programmed to execute one or more functions embodied by computer programs. Alternatively, the traveling support device that have been described in the present disclosure may be implemented by a dedicated computer provided to include a processor with one or more dedicated hardware logic circuits. Alternatively, the traveling support device that have been described in the present disclosure may be implemented by one or more dedicated computers each configured by combining memory and a processor programmed to execute one or more functions and a processor including one or more dedicated hardware logic circuits. The computer programs may be stored, as instructions to be executed by a computer, in a tangible non-transitory computer-readable recording medium.

Although the present disclosure has been described in accordance with the examples, it is understood that the present disclosure is not limited to such examples or structures. The present disclosure also includes various modifications and variations within an equivalent range. In addition, various combinations and forms, and other combinations and forms further including only one element or more or less than the element, are also within the spirit and the scope of the present disclosure.

What is claimed is:

1. A traveling support device that is applied to a vehicle equipped with an imaging device that captures an image of a surrounding of an own vehicle, and performs a traveling support control for the own vehicle based on the image captured by the imaging device, the traveling support device comprising:
   a recognizer that recognizes, based on the image, a front object located ahead of the own vehicle in a direction of travel and a boundary portion located on each of left and right sides of a road on which the own vehicle is traveling;
   an angular width calculator that calculates an object point and a boundary point on one line extending along a width direction of the own vehicle in the image and calculates, for the object point and the boundary point, an angular width based on an origin defined in the image, the object point indicating a predetermined portion of the front object, the boundary point being on the boundary portion;
   an obtainer that obtains distance information indicating a distance to the predetermined portion of the front object;
   a lateral distance calculator that calculates, based on the angular width calculated by the angular width calculator and the distance information, a lateral distance between the predetermined portion of the front object and the boundary portion along the width of the own vehicle; and
   a controller that performs the traveling support control to the front object based on the lateral distance, wherein
   the recognizer recognizes, as the front object, another vehicle traveling in an adjacent lane that is adjacent to an own lane in which the own vehicle is traveling,
   the angular width calculator calculates, as the angular width, a first angular width at a position of an own-vehicle-end lateral end portion of a rear surface of the other vehicle recognized by the recognizer and a second angular width at a position of a front-end portion of an own-vehicle-end side surface of the other vehicle,
   the lateral distance calculator calculates, as the lateral distance, a first lateral distance corresponding to the first angular width of the other vehicle and a second lateral distance corresponding to the second angular width of the other vehicle, and
   the controller performs the traveling support control for the other vehicle based on the first lateral distance and the second lateral distance to the other vehicle.

2. The traveling support device according to claim 1, wherein
   the recognizer recognizes, as the front object, an oncoming vehicle traveling from ahead of the own vehicle, the angular width calculator calculates, as the angular width, a first angular width at a position of an own-vehicle-end lateral end portion of a front surface of the oncoming vehicle recognized by the recognizer and a second angular width at a position of a rear end portion of an own-vehicle-end side surface of the oncoming vehicle, the lateral distance calculator calculates, as the lateral distance, a first lateral distance corresponding to the first angular width of the oncoming vehicle and a second lateral distance corresponding to the second angular width of the oncoming vehicle, and the controller performs the traveling support control for the oncoming vehicle based on the first lateral distance and the second lateral distance to the oncoming vehicle.

3. A traveling support device that is applied to a vehicle equipped with an imaging device that captures an image of a surrounding of an own vehicle, and performs a traveling support control for the own vehicle based on the image captured by the imaging device, the traveling support device comprising:

a recognizer that recognizes, based on the image, a front object located ahead of the own vehicle in a direction of travel and a boundary portion located on each of left and right sides of a road on which the own vehicle is traveling;

an angular width calculator that calculates an object point and a boundary point on one line extending along a width direction of the own vehicle in the image and calculates, for the object point and the boundary point, an angular width based on an origin defined in the image, the object point indicating a predetermined portion of the front object, the boundary point being on the boundary portion;

an obtainer that obtains distance information indicating a distance to the predetermined portion of the front object;

a lateral distance calculator that calculates, based on the angular width calculated by the angular width calculator and the distance information, a lateral distance between the predetermined portion of the front object and the boundary portion along the width of the own vehicle; and a controller that performs the traveling support control to the front object based on the lateral distance, wherein the recognizer recognizes, as the front object, an oncoming vehicle traveling from ahead of the own vehicle, the angular width calculator calculates, as the angular width, a first angular width at a position of an own-vehicle-end lateral end portion of a front surface of the oncoming vehicle recognized by the recognizer and a second angular width at a position of a rear end portion of an own-vehicle-end side surface of the oncoming vehicle, the lateral distance calculator calculates, as the lateral distance, a first lateral distance corresponding to the first angular width of the oncoming vehicle and a second lateral distance corresponding to the second angular width of the oncoming vehicle, and the controller performs the traveling support control for the oncoming vehicle based on the first lateral distance and the second lateral distance to the oncoming vehicle.

4. A traveling support device that is applied to a vehicle equipped with an imaging device that captures an image of a surrounding of an own vehicle, and performs, as a traveling support control based on the image captured by the imaging device, a following traveling control to a leading vehicle traveling ahead of the own vehicle in a direction of travel in an own lane in which the own vehicle is traveling, the traveling support device comprising:

a recognizer that recognizes, based on the image, a front object located ahead of the own vehicle in the direction of travel and a boundary portion located on each of left and right sides of a road on which the own vehicle is traveling;

an angular width calculator that calculates an object point and a boundary point on one line extending along a width direction of the own vehicle in the image and calculates, for the object point and the boundary point, an angular width based on an origin defined in the image, the object point indicating a predetermined portion of the front object, the boundary point being on the boundary portion;

an obtainer that obtains distance information indicating a distance to the predetermined portion of the front object;

a lateral distance calculator that calculates, based on the angular width calculated by the angular width calculator and the distance information, a lateral distance between the predetermined portion of the front object and the boundary portion along the width of the own vehicle; and a controller that performs the traveling support control to the front object based on the lateral distance, wherein the recognizer recognizes, as the front object, another vehicle traveling in an adjacent lane that is adjacent to the own lane and in which a vehicle travels in the same direction as a direction of travel of a vehicle in the own lane, and recognizes a marking line between the own lane and the adjacent lane as the boundary portion, the angular width calculator calculates the angular width of the other vehicle recognized by the recognizer, at a position of a front-end portion of an own-vehicle-end side surface of the other vehicle, the lateral distance calculator calculates the lateral distance to the front-end portion, and the controller determines, based on the lateral distance, whether to select the other vehicle as the leading vehicle.

5. The traveling support device according to claim 4, wherein the angular width calculator calculates, as the angular width, a first angular width at a position of an own-vehicle-end lateral end portion of a rear surface of the other vehicle recognized by the recognizer and a second angular width at the position of the front-end portion of the own-vehicle-end side surface of the other vehicle, the lateral distance calculator calculates, as the lateral distance, a first lateral distance corresponding to the first angular width and calculates a second lateral distance corresponding to the second angular width, and based on a transition from a state in which both the first lateral distance and the second lateral distance have positive values to a state in which at least the second lateral distance has a negative value where the lateral distance has a negative value on an own lane side of the marking line and a positive value on an opposite side of the marking line from the own lane, the controller determines that the other vehicle is to be selected as the leading vehicle.

6. The traveling support device according to claim 4, wherein the recognizer recognizes, as a left marking line, the marking line located on a left side of the own lane and recognizes, as a right marking line, the marking line located on a right side of the own lane, the angular width calculator calculates a left angular width and a right angular width as the angular width at the front-end portion of the other vehicle, the left angular width being the angular width with respect to the left marking line, the right angular width being the angular width with respect to the right marking line, the lateral distance calculator calculates a left lateral distance and a right lateral distance as the lateral distance to the front-end portion of the other vehicle, the left lateral distance being calculated based on the left angular width, the right lateral distance being calculated based on the right angular width, and the controller makes a leading vehicle determination based on the lateral distance to the front-end portion on a condition that a difference between a lateral width of the own lane and a distance difference between the left lateral distance and the right lateral distance is less than a predetermined difference.

7. The traveling support device according to claim 4, wherein the recognizer recognizes, as the boundary portion, the marking line that is visible in the image as an actual marking line, and recognizes, as the boundary portion, the marking line that is not visible or is hardly visible in the image as a virtual marking line, in response to a predetermined condition including a condition that the lateral distance to the front-end portion of the other vehicle is within a predetermined range being met, the controller determines that the other vehicle is to be selected as the leading vehicle in the following traveling control, and the controller makes an implementation mode of a leading vehicle determination based on the predetermined condition different depending on whether the actual marking line is recognized and the lateral distance is calculated based on the actual marking line or the virtual marking line is recognized instead of the actual marking line and the lateral distance is calculated based on the virtual marking line.

8. The traveling support device according to claim 7, wherein the controller includes a counter that counts a total number of times the condition that the lateral distance to the front-end portion of the other vehicle is within the predetermined range is met consecutively, and when the lateral distance is out of the predetermined range, resets a count value, when the count value of the counter reaches a predetermined value, the controller determines that the predetermined condition has been met and the other vehicle is to be selected as the leading vehicle in the following traveling control, when the actual marking line is recognized and the lateral distance calculated based on the actual marking line is within the predetermined range, the counter increments the count value by a predetermined number, and when the virtual marking line is recognized instead of the actual marking line and the lateral distance calculated based on the virtual marking line is within the predetermined range, the counter maintains the count value or increments the count value by a number less than the predetermined number.

9. A traveling support device that is applied to a vehicle equipped with an imaging device that captures an image of a surrounding of an own vehicle, and performs, as a traveling support control based on the image captured by the imaging device, a collision damage reduction control for avoiding collision with an object or reducing collision with the object the traveling support device comprising:

a recognizer that recognizes, based on the image, a front object located ahead of the own vehicle in a direction of travel and a boundary portion located on each of left and right sides of a road on which the own vehicle is traveling;

an angular width calculator that calculates an object point and a boundary point on one line extending along a width direction of the own vehicle in the image and calculates, for the object point and the boundary point, an angular width based on an origin defined in the image, the object point indicating a predetermined portion of the front object, the boundary point being on the boundary portion;

an obtainer that obtains distance information indicating a distance to the predetermined portion of the front object;

a lateral distance calculator that calculates, based on the angular width calculated by the angular width calculator and the distance information, a lateral distance between the predetermined portion of the front object and the boundary portion along the width of the own vehicle; and a controller that performs the traveling support control to the front object based on the lateral distance, wherein the recognizer includes:

a first recognizer that recognizes, as the boundary portion, a marking line defining an own lane in which the own vehicle is traveling; and a second recognizer that recognizes, as the boundary portion, a boundary marking object that is a road boundary different from the marking line and extending along a road on which the own vehicle is traveling, the controller determines, based on the lateral distance, whether to select the object as a target of the collision damage reduction control, and the controller makes an implementation mode of the collision damage reduction control based on the lateral distance different depending on whether the marking line is recognized as the boundary portion or the boundary marking object is recognized as the boundary portion.

* * * * *